United States Patent Office 3,475,524
Patented Oct. 28, 1969

3,475,524
METHOD OF BONDING ALUMINUM NICKEL ALLOY PARTICLES
David M. Mason, Chicago, Ill., assignor to Institute of Gas Technology, Chicago, Ill., a not-for-profit corporation of Illinois
No Drawing. Filed May 2, 1966, Ser. No. 547,043
Int. Cl. C01f 7/42
U.S. Cl. 264—82    7 Claims

ABSTRACT OF THE DISCLOSURE

A method for making a consolidated structure which includes: providing particles of a material containing metallic aluminum; maintaining the particles immobilized; and treating the immobilized particles with water to form hydrated aluminum oxide which bonds together the particles into the consolidated structure.

---

This invention relates to a new and improved method for making consolidated compact materials. In particular, the invention relates to a method for bonding together particles containing metallic aluminum by treating such particles with water while maintaining the particles immobilized, whereby part of the aluminum metal reacts with water to form hydrated aluminum oxide which bonds together the immobilized finely-divided particles.

It is well known that aluminum reacts with water to form oxide with varying degrees of hydration, depending upon the conditions under which the water contacts the aluminum, by the following general reaction:

$$Al + H_2O \rightarrow Al_2O_3\,(H_2O)_x + H_2$$

I have now found that hard, consolidated, compact structures can be made by treating metallic aluminum-containing particles with water while maintaining the particles immobilized and the making of such structures is the object of my invention. Immobilization is critical since otherwise, oxide hydrate bonds cannot form between adjacent particles to produce a consolidated compact mass.

The hardening of the particles into a consolidated, compact mass results from formation, by reaction of the aluminum-containing particles with water, of alumina hydrates that cement together the alloy particles. However, if the particles are not restrained with sufficient firmness, the hydrogen developed by reaction of the aluminum with water will cause movement of the particles with respect to one another and prevent a sufficient degree of cementing. Thus, it is necessary to provide for restraining movement of the particles during water treatment. I have found that this can be accomplished by admixing the particles with a temporary binder such as freshly precipitated aluminum hydroxide or an organic material such as cellulose gum. After water treatment is completed, the organic binder may be removed by heat or other suitable means, if desired.

Physical methods of restraining movement of the particles during water treatment can also be used. For example, the particles can be treated while forceably confined in an enclosed volume such as a mold. Also, the particles, without added binding agent, can be placed in a mold having an open top and a porous bottom, and water or aqueous solution circulated down through the bed of powder. The pressure differential across the bed generated by the flow of the solution holds the particles in place. Wet steam under pressure can also be used with the steam flow over the particles acting not only to provide water for the reaction but further to remove generated hydrogen which is formed during the reaction of aluminum and water.

My invention has particular application to the making of skeletal nickel catalysts which as is well known in the art are commonly made by leaching a crushed nickel-aluminum alloy such as Raney nickel alloy with alkali hydroxide, such as sodium hydroxide, until the aluminum is completely dissolved as sodium aluminate, leaving the nickel as a very finely-divided powder.

By my method, finely-divided particles of an aluminum-containing nickel alloy of about 30–50% nickel and 70–50% aluminum are treated with water while the particles are bonded together by the formation of hydrated aluminum oxide on the particle surfaces. I have found quite unexpectedly that such hydrate formation produces a hardened mass which is then suitable for leaching as is known in the art to form a catalyst structure containing nickel and hydrated aluminum oxide.

My invention is not limited, however, to formation of nickel catalyst structures. The hydration bonding principle of my invention is useful in bonding together any finely-divided materials which contain metallic aluminum. Inert matter, such as for example, insulating material can be admixed with the aluminum-containing particles and subsequent water treatment of immobilized particles will bond together the particles into a matrix which hold together the insulating material.

The aluminum-containing particles of my invention may be powdered aluminum metal or aluminum alloys, such as nickel-aluminum alloy or iron-aluminum alloy, or may be admixtures of aluminum metal with other metal oxides or metal compounds. Alternatively, any fine particles containing aluminum metal which will react with water under the conditions of my process can be used to form the consolidated, compact materials of my invention. It is well known in the art that certain aluminum-containing alloys, such as aluminum-bronze and the magnetic alloys containing minor amounts of aluminum, will not be operative by the techniques of my invention and I do not intend to include them in the scope thereof.

Particle size is not critical and may include objects as large as brick, provided a means for escape of hydrogen is available. I have obtained good results using powders passing a No. 80 sieve.

In practicing the method of my invention, the aluminum-containing particles can be contacted with liquid water or with wet steam to effect the water-aluminum reaction. With certain aluminum-containing starting materials, it is desirable to use water containing a small quantity of alkali hydroxide which serves to remove aluminum oxide coating which may be on the aluminum surface thereby to provide a clean metallic aluminum surface for reaction with water. Alternatively, amalgamation of the aluminum surface may be used in place of employing alkali hydroxide in the treating water. Contact time will vary with water temperature and particle composition. It will be appreciated that the optimum contact time and temperatures will depend upon the particle size and aluminum content and can be determined within the skill of the art for particular applications.

The following non-limiting examples illustrate the method of my invention.

Example I

A solution was made containing about 3% by volume cellulose gum in water. Powdered aluminum-nickel alloy containing 58% Al and 42% Ni 100- to 140-mesh, was mixed with the above solution until a thick paste was formed. The paste was spread into the depressions of a corrugated aluminum foil mold. The mold was dried in an oven at 150° C. for one hour.

The mold was then removed from the oven, placed in a tray, and covered with boiling water. After 2 hours there was obtained a hard, consolidated, compact body.

Example II

A solution was made containing water and aluminum nitrate, equivalent to 1.1% $Al_2O_3$ by wt. A 12 ml. portion of the solution was treated with ammonia to a pH of 7 to precipitate aluminum hydroxide. 20 g. of 100- to 200-mesh powdered alumina and 10 g. of 140- to 200-mesh powdered nickel-aluminum alloy were mixed with the above. The resulting slurry was spread into the depressions of a corrugated, aluminum foil mold and heated in an oven at 150° C. for two hours. The mold was removed from the oven, placed in a tray, and covered with water at 85° C. After three minutes, cold water was added to cool the contents of the tray and the mold was maintained covered by water overnight. A body comparable in hardness to commercial catalysts was obtained.

Example III

Powdered nickel-aluminum alloy, 140- to 200-mesh, containing 58% Al and 42% Ni were spread on top of a porous Pyrex plate to make a cylindrical bed ⅛ inch thick. Wet steam was applied to the top of the bed at 1½ lbs. pressure. The powder was held immobilized under the steam for one hour. A hardened mass was obtained.

Example IV

A solution was made containing water and aluminum nitrate (1% $Al_2O_3$ by wt.). The solution was treated with ammonia, until a pH of 6.5 was reached, to precipitate aluminum hydroxide. Powdered aluminum-iron alloy, containing about 50 wt. percent each of aluminum and iron, 100- to 140-mesh, was added until a thick paste was obtained. The resulting paste was spread into the depressions of a corrugated, aluminum foil mold and was heated in an oven at 125° C. for 3 hours. The mold was then removed from the oven, placed in a tray, and covered with hot water. The mold was allowed to cool and was left covered with water overnight. A hard, consolidated body was obtained.

Having disclosed my invention, I claim:

1. Method for making a consolidated structure suitable for rendering into catalyst comprising: (1) providing particles of aluminum-nickel alloy; (2) maintaining said particles immobilized; (3) treating said immobilized particles with water; and (4) removing generated hydrogen gas during said treating; whereby aluminum in said particles reacts with water to form hydrated aluminum oxide which bonds together the particles.

2. Method of claim 1 wherein said nickel-aluminum alloy is about 30% to 50% by weight nickel and about 70% to 50% by weight aluminum.

3. Method of claim 1 wherein said water is at a temperature from ambient to about 100° C.

4. Method of claim 1 wherein said water is wet steam.

5. Method of claim 1 wherein said particles are maintained immobilized in a cellulose gum.

6. Method of claim 1 wherein said particles are maintained immobilized by confinement in an enclosed volume.

7. Method of claim 1 wherein said particles are maintained immobilized by subjecting them to fluid pressure, said fluid being water or steam.

References Cited

UNITED STATES PATENTS

| | | | |
|---|---|---|---|
| 2,054,454 | 9/1936 | Thies et al. | 106—193 |
| 2,867,505 | 1/1959 | Bloch | 23—143 |
| 2,947,646 | 8/1960 | Devaney et al. | 106—193 |

FOREIGN PATENTS

| | | |
|---|---|---|
| 790,970 | 2/1958 | Great Britain. |

DONALD J. ARNOLD, Primary Examiner

U.S. Cl. X.R.

106—193; 264—109, 111, 128